(12) United States Patent
Theile et al.

(10) Patent No.: US 10,744,683 B2
(45) Date of Patent: Aug. 18, 2020

(54) METHOD FOR PRODUCING A WIND TURBINE ROTOR BLADE, AND WIND TURBINE ROTOR BLADE

(71) Applicant: Wobben Properties GmbH, Aurich (DE)

(72) Inventors: Benjamin Theile, Passau (DE); Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 178 days.

(21) Appl. No.: 15/739,916

(22) PCT Filed: Jun. 29, 2016

(86) PCT No.: PCT/EP2016/065180
§ 371 (c)(1),
(2) Date: Dec. 26, 2017

(87) PCT Pub. No.: WO2017/001503
PCT Pub. Date: Jan. 5, 2017

(65) Prior Publication Data
US 2018/0186040 A1    Jul. 5, 2018

(30) Foreign Application Priority Data

Jul. 1, 2015  (DE) .......................... 10 2015 212 268

(51) Int. Cl.
*B29C 35/00* (2006.01)
*B29C 35/02* (2006.01)
(Continued)

(52) U.S. Cl.
CPC ...... *B29C 35/0272* (2013.01); *B29C 35/0805* (2013.01); *B29C 70/025* (2013.01);
(Continued)

(58) Field of Classification Search
CPC ..................... B29C 35/0805; B29C 35/0811
See application file for complete search history.

(56) References Cited

U.S. PATENT DOCUMENTS

2009/0116966 A1*  5/2009  Althoff ................. B29C 70/025
                                                          416/230
2009/0127253 A1   5/2009  Stark et al.
(Continued)

FOREIGN PATENT DOCUMENTS

CN    101435406 A    5/2009
CN    103748356 A    4/2014
(Continued)

OTHER PUBLICATIONS

Office Action from copending Indian applciation 20171704483, dated Jun. 12, 2020 (Year: 2020).*

*Primary Examiner* — Timothy Kennedy
(74) *Attorney, Agent, or Firm* — Seed Intellectual Property Law Group LLP

(57) ABSTRACT

A method of producing a wind turbine rotor blade For that purpose metal particles, metal powder or metal chips are mixed into a matrix used to produce the rotor blade. Inductive heating of the matrix with the metal particles, metal powder or metal chips is then effected to harden the matrix in at least one portion of the wind turbine rotor blade.

4 Claims, 3 Drawing Sheets

(51) Int. Cl.
  B29C 35/08 (2006.01)
  B29C 70/02 (2006.01)
  B29K 505/00 (2006.01)

(52) U.S. Cl.
  CPC ... *B29C 2035/0811* (2013.01); *B29K 2505/00* (2013.01); *Y02E 10/721* (2013.01); *Y02E 10/726* (2013.01)

(56) References Cited

U.S. PATENT DOCUMENTS

| | | |
|---|---|---|
| 2009/0148300 A1 | 6/2009 | Driver et al. |
| 2010/0065552 A1 | 3/2010 | Matsen et al. |
| 2012/0211144 A1 | 8/2012 | Litzenberger et al. |
| 2013/0164133 A1 | 6/2013 | Grove-Nielsen |
| 2014/0030093 A1 | 1/2014 | Dahl et al. |
| 2014/0037455 A1 * | 2/2014 | Dahl .................. F03D 1/0675 416/223 R |
| 2015/0336338 A1 | 11/2015 | Bordere et al. |

FOREIGN PATENT DOCUMENTS

| | | |
|---|---|---|
| CN | 104379639 A | 2/2015 |
| DE | 102008055478 A1 | 6/2009 |
| DE | 102009028613 A1 | 2/2011 |
| EP | 2133235 A2 | 12/2009 |
| JP | 2009074421 A | 4/2009 |

\* cited by examiner

METHOD FOR PRODUCING A WIND TURBINE ROTOR BLADE, AND WIND TURBINE ROTOR BLADE

BACKGROUND

Technical Field

The present invention concerns a method of producing a wind turbine rotor blade and a wind turbine rotor blade.

Description of the Related Art

A wind turbine rotor blade has a rotor blade root and a rotor blade tip. The rotor blade root is typically thicker because it must carry fixing means, like for example threaded rods or the like, so that the rotor blade can be fixed to a rotor hub or a blade adaptor by way of the fixing means. To achieve adequate strength for the fixing means in the rotor blade root region, the region of the rotor blade root must be considerably thicker or must involve more material than the remaining region of the rotor blade. The material of the rotor blades is typically GRP (glass fiber-reinforced plastic) or CRP (carbon fiber-reinforced plastic) with an epoxy resin. In manufacture or production of the rotor blades and in particular the rotor blade roots a great deal of energy and time is required for temperature conditioning or heating of the adhesive surfaces or the epoxy resin.

On the German patent application from which priority is claimed the German Patent and Trade Mark Office searched the following documents: DE 10 2008 055 478 A1, DE 10 2009 028 613 A1 and US 2010/0065552 A.

BRIEF SUMMARY

Provided is a method of producing a wind turbine rotor blade, which can be carried out in more energy-efficient fashion and more quickly, and a corresponding rotor blade.

Thus there is provided a method of producing a wind turbine rotor blade. For that purpose metal particles, metal powder or metal chips are mixed into a matrix used to produce the rotor blade. Inductive heating of the matrix with the metal particles, metal powder or metal chips is then effected to harden the matrix in at least one portion of the wind turbine rotor blade.

The rotor blade of the wind turbine has glass fiber-reinforced plastic GRP and/or carbon fiber-reinforced plastic CRP which are bound into a matrix (resin, epoxy resin). In production of the rotor blade, the resin has to be hardened. That is effected by adding metal particles, metal power or metal chips into the matrix of the rotor blade and by inductive heating of the matrix with the metal particles, metal powder or metal chips. That is advantageous because in that way uniform heating of the matrix is achieved (from the interior outwardly) to harden the matrix.

According to an aspect of the present invention the matrix has epoxy resin. Optionally the proportion of the metal powder, metal particles or metal chips can be between 5 and 20 percent by weight of the matrix.

The rotor blade has plastic fibers (glass fibers or carbon fibers) and a matrix which is typically a resin like for example epoxy resin. The matrix is thus a constituent part of the rotor blade.

There is provided inductive heating of the metal particles, metal powder or metal chips in the matrix in order to provide for uniform heating of the rotor blade to harden the matrix. That is advantageous because it is possible in that way to reduce the production time as heat also occurs in the interior of the rotor blade.

According to a further aspect of the present invention the matrix (or the adhesive) is provided with the metal particles, the metal powder or the metal chips in the region of the rotor blade root and the matrix (or the adhesive) is exposed in the region of the rotor blade root to an induction field generated by an induction coil so that the metal particles, the metal powder or the metal chips are inductively heated and the heat is given off to the surrounding matrix (or the surrounding adhesive).

According to a further aspect of the present invention the wind turbine rotor blade has a first and a second portion, the second portion being arranged around the first portion. The matrix with the metal powder, the metal particles or the metal chips is provided between the first and second portions. The first and second portions are provided in particular in the region of the rotor blade root.

Also provided is a wind turbine rotor blade having a rotor blade root, a rotor blade tip and a matrix in the region of the rotor blade root. The matrix has metal powder, metal particles or metal chips. The proportion of the metal powder, the metal particles or the metal chips is between 5 and 20 percent by weight of the matrix.

According to an aspect of the present invention metal powder or metal chips is introduced into or mixed into the adhesive, which is used for the adhesive action in the region of the rotor blade root. By virtue of using induction coils the metal powder or the metal chips in the adhesive and thus in the rotor blade root can be heated so that the adhesive and the rotor blade root is heated to permit temperature conditioning of the adhesive surfaces. That can therefore permit active heating of the rotor blade root. In addition it is possible in that way for only the adhesive to be heated or hardened.

Therefore inductive heating or heat treatment of a matrix is proposed, which is used in the production or manufacture of a wind turbine rotor blade. In particular it is proposed that a matrix be inductively heated in the region of the rotor blade root (and thus also the surrounding glass fibers and/or carbon fibers). The matrix can represent for example epoxy resin. Metal powder and/or metal chips are added to the matrix. Upon inductive heating the metal becomes warm and transmits the warmth to the matrix so that the matrix is also warmed. That has the advantage in particular that the generation of the warmth and thus the heating source is within the matrix and the warmth therefore does not have to be supplied exclusively from the exterior so that more uniform heating takes place.

According to an aspect of the present invention the proportion of metal powder or metal chips in the matrix can be between 5 and 20 percent by weight.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
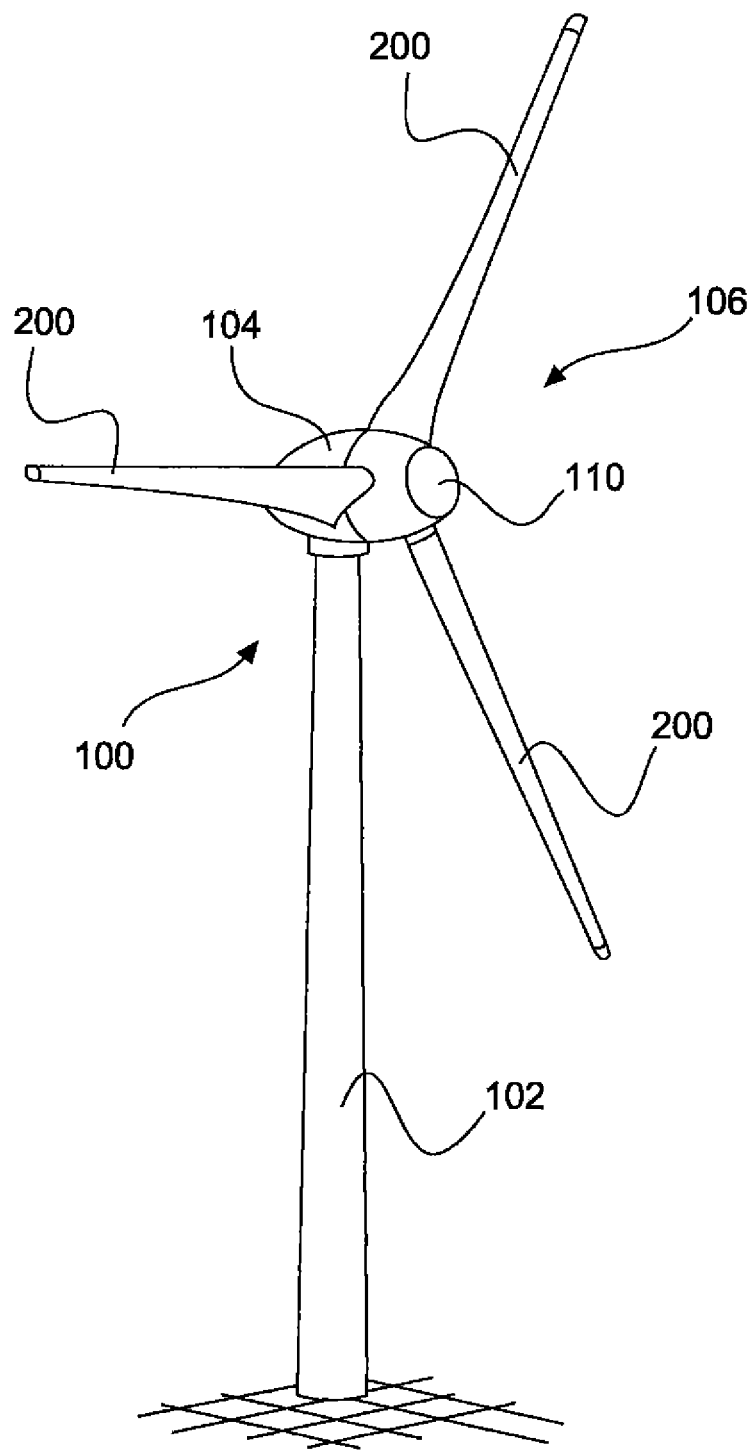
FIG. 1 shows a diagrammatic view of a wind turbine according to the invention.

FIG. 1 shows a diagrammatic view of a wind turbine according to the invention. The wind turbine 100 has a tower 102 and a pod 104 on the tower 102. Provided on the pod 104 is an aerodynamic rotor 106 having three rotor blades 200 and a spinner 110. In operation of the wind turbine the aerodynamic rotor 106 is caused to rotate by the wind and thus also rotates a rotor or rotor member of a generator directly or indirectly coupled to the aerodynamic rotor 106. The electric generator is arranged in the pod 104 and generates electrical energy. The pitch angles of the rotor blades 200 can be altered by pitch motors at the rotor blade roots of the respective rotor blades 200.

Figure 2:
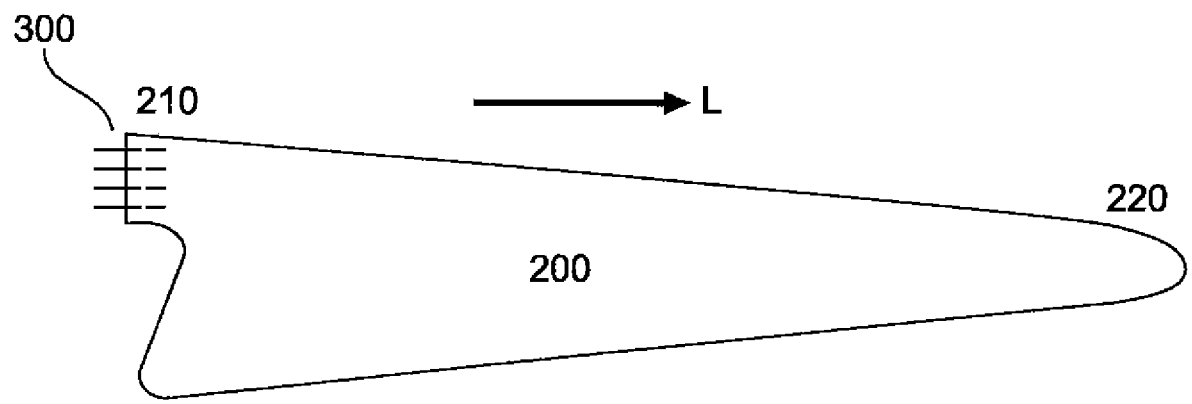
FIG. 2 shows a diagrammatic view of a wind turbine rotor blade.

FIG. 2 shows a diagrammatic view of a wind turbine rotor blade. The rotor blade 200 has a rotor blade root 210 and a rotor blade tip 220 and extends along a longitudinal direction L. The rotor blade is made from glass fiber-reinforced plastic GRP and/or carbon fiber-reinforced plastic CRP with a matrix (or adhesive) 600 (for example epoxy resin). Provided in the region of the rotor blade root 210 are fixing means 300 which project with their first end into the rotor blade root region and which can be fixed with their second end to a rotor hub of a wind turbine.

Figure 3:
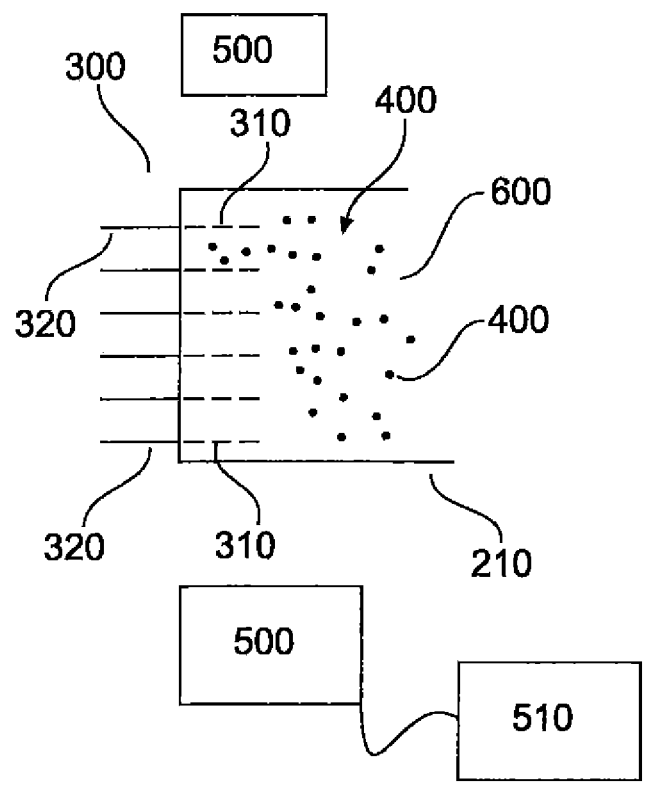
FIG. 3 shows a diagrammatic view of a rotor blade root of a wind turbine rotor blade during production of the rotor blade.

FIG. 3 shows a diagrammatic view of a rotor blade root of a wind turbine rotor blade during production of the rotor blade. Metal powder or metal chips or metal particles 400 can be provided in particular in the region of the rotor blade root 210 in the material or the matrix 600 of the rotor blade root 210. In addition provided in the region of the rotor blade root is a plurality of fixing units 300 which with their first end 310 project into the rotor blade root region 210 and with their second end 320 project out of the rotor blade root 210. The rotor blade root 210 is placed in the region of an induction coil 500 and the induction coil 500 is supplied with current/voltage by means of a power supply 510 to build up an induction field. The result of that induction field is that the metal particles, metal powder or metal chips 400 in the matrix 600 of the rotor blade root 210 are inductively heated. The metal particles 400 deliver the heat to the surrounding matrix 600 so that the matrix 600 is heated in the region of the rotor blade root 210 so that the matrix or adhesive used can be hardened therethrough and can be temperature-conditioned.

According to an embodiment of the invention the metal particles, the metal powder or the metal chips 400 are provided in the rotor blade 200. Optionally the proportion of metal particles in the matrix 600 can be between 5 and 20 percent by weight.

The metal particles 400 can be heated in the induction field generated by the induction coil 500. That makes it possible to achieve active heating in particular of the rotor blade root 210.

The presence of the metal particles 400 in the matrix 600 of the rotor blade 200 can provide that the material becomes conductive in that region. If that is the case sufficient lightning protection has to be ensured as otherwise the rotor blade can be damaged in the event of a lightning strike.

According to an aspect of the present invention the metal powder 400 is provided only in the region of the rotor blade root 210 which in the mounted condition of the rotor blade is typically within the pod. The pod of the wind turbine can here act as a Faraday cage so that the use of metal particles in the matrix 600 of the rotor blade root 210 does not have a detrimental effect on the capability of providing lightning protection for the wind turbine.

Particularly in the case of very thick parts the use of metal particles in the matrix of the rotor blade is advantageous as it is possible to permit faster and more uniform heating.

Figure 4:
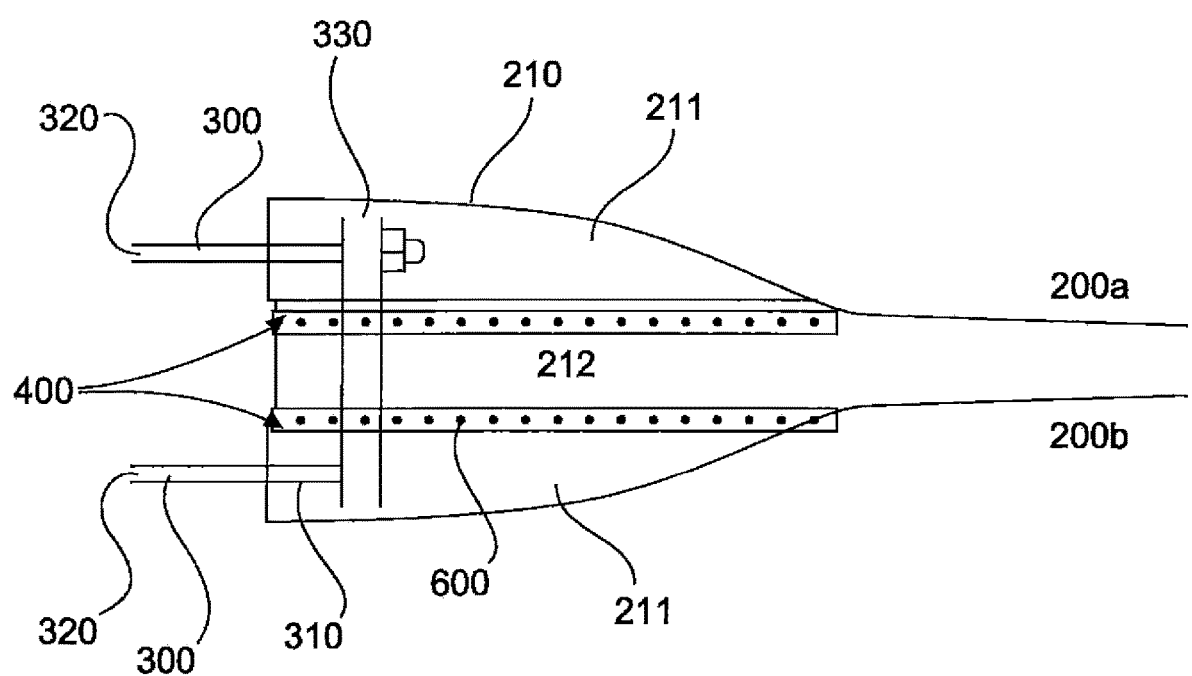
FIG. 4 shows a cross-section through a rotor blade root of a rotor blade according to the invention.

FIG. 4 shows a cross-section through a rotor blade root of a rotor blade according to the invention. The rotor blade root 210 can have a central portion 212 and a further portion 211 around the portion 212. The portion 211 can be in the form of a GRP (glass fiber-reinforced plastic) thickening. Optionally a portion which is to be bonded in place can be provided between the two portions 211, 212. The matrix or the adhesive 600 is provided with metal particles, metal powder 400 or the like in those regions. In order to bond the portions 211, 212 together the rotor blade root 210 is placed as shown in FIG. 3 in an induction field so that the metal particles 400 are heated and the adhesive bond can harden.

FIG. 4 shows a region 200*a* outside the rotor blade and a region 200*b* within the rotor blade. The rotor blade root is preferably of a rotational symmetrical configuration.

The rotor blade of the wind turbine has glass fiber-reinforced plastic GRP and/or carbon fiber-reinforced plastic CRP which are bound into a matrix (resin, epoxy resin). In production of the rotor blade the resin has to be hardened. That is effected by adding metal particles, metal powder or metal chips in the matrix of the rotor blade and by inductive heating of the matrix with the metal particles, metal powder or metal chips. That is advantageous because that provides for uniform heating (from the interior outwardly) of the matrix to harden the matrix.

The invention claimed is:

1. A method comprising:
   producing a wind turbine rotor blade comprising at least one of a glass fiber-reinforced plastic or carbon fiber-reinforced plastic bounded into a matrix, the producing comprising:
   mixing metal particles, metal powder, or metal chips into the matrix, and
   hardening the matrix in at least one portion of the wind turbine rotor blade by inductively heating the matrix with the metal particles, metal powder or metal chips,
   wherein a proportion of the metal powder, the metal particles, or the metal chips is between 5 and 20 percent by weight of the matrix.

2. The method according to claim 1 wherein the matrix with the metal particles, metal powder, or metal chips is provided at an end of a rotor blade, wherein the end of the rotor blade includes a rotor blade root, and
   wherein in a region of the rotor blade root, the matrix is exposed to an induction field generated by an induction coil so that the metal particles, metal powder or metal chips are inductively heated and transfer the heat to the matrix.

3. The method according to claim 1 wherein the wind turbine rotor blade has a first portion and a second portion, the second portion being arranged around the first portion, and
   wherein the matrix with the metal powder, the metal particles, or the metal chips is provided between the first and second portions.

4. The method according to claim 1 wherein the matrix has resin or epoxy resin.

* * * * *